(12) United States Patent
Hahn et al.

(10) Patent No.: US 12,337,373 B2
(45) Date of Patent: Jun. 24, 2025

(54) METHOD AND DEVICE FOR PRODUCING A ROLLING BEARING CAGE FROM A SLEEVE-LIKE BLANK

(71) Applicant: HSP SCHWAHLEN GMBH, Langenfeld (DE)

(72) Inventors: Dennis Hahn, Solingen (DE); Giovanni Sorrentino, Neuss (DE); Christian Schwahlen, Haan (DE)

(73) Assignee: HSP SCHWAHLEN GMBH (DE)

( * ) Notice: Subject to any disclaimer, the term of this patent is extended or adjusted under 35 U.S.C. 154(b) by 0 days.

(21) Appl. No.: 18/577,094

(22) PCT Filed: May 9, 2022

(86) PCT No.: PCT/EP2022/062399
§ 371 (c)(1),
(2) Date: Jan. 5, 2024

(87) PCT Pub. No.: WO2023/280454
PCT Pub. Date: Jan. 12, 2023

(65) Prior Publication Data
US 2024/0316615 A1    Sep. 26, 2024

(30) Foreign Application Priority Data
Jul. 9, 2021   (DE) .................... 10 2021 117 777.4

(51) Int. Cl.
*B21D 53/12*    (2006.01)
*B21D 22/18*    (2006.01)
(Continued)

(52) U.S. Cl.
CPC ............ *B21D 53/12* (2013.01); *B21D 22/18* (2013.01); *B23P 15/003* (2013.01);
(Continued)

(58) Field of Classification Search
CPC ....... B23P 15/003; B21D 22/18; B21D 53/12; Y10T 29/49668; Y10T 29/49671; Y10T 29/49691
See application file for complete search history.

(56) References Cited

U.S. PATENT DOCUMENTS

| | | | |
|---|---|---|---|
| 1,404,383 A | | 1/1922 | Flaherty |
| 1,759,906 A | * | 5/1930 | Kerruish ............... F16C 17/022 |
| | | | 29/898.056 |

(Continued)

FOREIGN PATENT DOCUMENTS

| | | | | |
|---|---|---|---|---|
| CN | 104847795 A | | 8/2015 | |
| DE | 1900354 A | * | 7/1970 | ............. B21D 22/18 |

(Continued)

OTHER PUBLICATIONS

Machine Translation of DE 102014223824A1 (Year: 2016).*
Third Party Observation for corresponding EP Patent Application No. 22728184.7 dated Feb. 18, 2025 (8 pages).

*Primary Examiner* — Jermie E Cozart
(74) *Attorney, Agent, or Firm* — Harness, Dickey & Pierce, P.L.C.

(57) ABSTRACT

A method is provided for producing an angular bearing cage from a sleeve-like blank. In order to significantly reduce the manufacturing costs compared to known solutions even for small series, the method comprises the following steps of: —Step A: providing a sleeve-like blank extending along an axis. —Step B: rolling a wall section to be formed of the blank while changing the angle of the wall section to be formed relative to the axis of the blank. —Step C: introducing rolling element pockets into the rolled wall section. A corresponding device and a correspondingly produced rolling bearing cage or angular bearing cage are also provided.

8 Claims, 2 Drawing Sheets

(51) Int. Cl.
  *B23P 15/00*     (2006.01)
  *F16C 33/54*     (2006.01)
(52) U.S. Cl.
  CPC ....... *F16C 33/543* (2013.01); *Y10T 29/49668* (2015.01); *Y10T 29/49671* (2015.01); *Y10T 29/49691* (2015.01)

(56) References Cited

U.S. PATENT DOCUMENTS

| | | | | |
|---|---|---|---|---|
| 2,267,863 | A * | 12/1941 | Frederick | F16C 33/4647 |
| | | | | 29/898.067 |
| 3,699,793 | A * | 10/1972 | Wagner | F16C 19/34 |
| | | | | 72/134 |
| 3,783,665 | A | 1/1974 | Ashizawa | |
| 6,213,648 | B1 | 4/2001 | Weidinger | |
| 2015/0174639 | A1* | 6/2015 | Beyfuss | F16C 33/543 |
| | | | | 29/898.067 |
| 2018/0163782 | A1* | 6/2018 | Kullin | B21D 53/12 |

FOREIGN PATENT DOCUMENTS

| | | | | |
|---|---|---|---|---|
| DE | 19807160 | A1 | 8/1999 | |
| DE | 102013215972 | A1 | 2/2015 | |
| DE | 102014223824 | A1 * | 5/2016 | ............ B21D 22/16 |
| GB | 153867 | A | 9/1921 | |
| GB | 1144179 | A | 3/1969 | |
| JP | 2009024859 | A * | 2/2009 | |
| JP | 2019-094969 | A | 6/2019 | |
| WO | WO-2011094552 | A1 * | 8/2011 | ............ B21D 11/08 |
| WO | WO-2013095246 | A1 * | 6/2013 | ............ B23K 11/04 |
| WO | WO-2013137086 | A1 * | 9/2013 | ........ B21D 41/026 |
| WO | WO-2016067537 | A1 * | 5/2016 | ............ B21D 22/14 |

* cited by examiner

METHOD AND DEVICE FOR PRODUCING A ROLLING BEARING CAGE FROM A SLEEVE-LIKE BLANK

CROSS REFERENCE TO RELATED APPLICATIONS

This application is a U.S. National Phase Application under 35 U.S.C. 371 of International Application No. PCT/EP2022/062399, filed on May 9, 2022, which claims priority to German Patent Application No. 10 2021 117 777.4, filed on Jul. 9, 2021. The entire disclosures of the above applications are expressly incorporated by reference herein.

TECHNICAL FIELD

The present invention relates to a method and a device for producing a rolling bearing cage from a sleeve-like blank.

BACKGROUND

An angular rolling bearing, hereinafter also referred to as an angular bearing, has an asymmetrical bearing cross section as compared to a conventional rolling bearing. This asymmetrical bearing cross section is used to absorb forces whose lines of action do not run exactly perpendicular to the axis but rather obliquely at a certain angle relative to the axis of rotation. The cage of an angular bearing—the so-called angular bearing cage—comprises a cone-shaped wall section in which a plurality of pockets is disposed—so-called rolling element pockets—for receiving the rolling elements such as balls or rollers. Angular bearings having diameters of more than 1 m are used, for example, as rotor blade bearings in wind turbines.

Angular bearing cages with an axial length of, for example, 10 to 30 cm and a diameter of 1 to 2 m as well as a wall thickness in the range from 5 to 20 mm are conventionally made from a component or semi-finished product, respectively, with a cone-shaped wall section, which is manufactured by turning or sheet metal pressure forming.

For turning, a material removal process, a tube or rolled ring with a square cross section is used as the starting material. The cross section of the raw material must be selected at least such that the cross section of the component to be manufactured fits thereinto. During turning, the excess material is removed by machining until the desired component contour has arisen. A lathe is used as the processing device in which the raw material is held using a clamping device. By turning the raw material, the excess material is removed by a stationary lathe tool until the desired component contour arises. Since the underside of the raw material and the region of the clamping jaws cannot be reached with the lathe tool, the component must be re-clamped for final processing.

For metal or sheet metal spinning, a sheet metal blank that is cut from a sheet of metal is used as the starting material. The setup of the processing device is similar to a lathe. The component is shaped using a hardened negative mold having the desired contour. The material is pressed against the negative mold using a counterpart and is formed onto the negative in small steps using a pressure roller using manual or hydraulic pressure. Metal or sheet metal pressure forming is a forming process without material removal. The material used is largely retained after forming. When the sheet metal is formed, it is thinned out, whereas the original sheet metal thickness is retained in the region of the counterpart. The inner diameter and the hem must be machine-finished. When metal pressure forming metal or sheet metal, the material used, the production time, and the energy consumed can be saved by 80 to 90% over the machining process. However, this process requires a separate negative mold for each component contour, which almost excludes the production of small series using this process for cost reasons.

The present invention is based on the object of providing a method and a device for producing a rolling bearing cage, in particular an angular bearing cage, in order to significantly reduce the manufacturing costs over known solutions, even for small series.

SUMMARY

To satisfy this object, the present invention provides a method and a device.

A method disclosed herein for producing a component or semi-finished product, respectively, with a formed wall section from a sleeve-like blank comprises the steps of:
  Step A: providing a sleeve-like blank extending along an axis.
  Step B: rolling a wall section to be formed of the blank while changing the angle of the wall section to be formed relative to the axis of the blank.

In order to produce an angular bearing cage from this component or semi-finished product, respectively, with a formed wall section, the method in particular comprises the additional step C of:
  Step C: introducing rolling element seats into the rolled wall section.

In principle, it is also possible to produce components other than angular bearing cages from this component or semi-finished product, respectively. In particular, the wall section to be formed of the blank is rolled to a cone shape. However, other geometries can also be produced by rolling the sleeve-like blank in the wall section to be formed.

This solution enables a forming production of a component or semi-finished product, respectively, for the manufacture of a rolling bearing cage, in particular an angular bearing cage, without using a negative mold, in order to simplify the production of the rolling bearing cage as a whole, and then combines the advantages of the known manufacturing techniques of turning (no negative mold) and metal pressure forming sheet metal (forming process without loss of material). By introducing the rolling element pockets into the rolled wall section, an angular bearing cage according to the invention is created from this component or semi-finished product produced by forming. The rolling element pockets are in particular introduced into the rolled wall section by machining, e.g. by drilling or milling.

Changing the angle of the wall section to be formed relative to the axis of the blank until the desired shape has been obtained is in particular carried out in several work steps. The blank can be formed to be cylindrical or, for example, slightly conical. With small cone angles (up to approx. 5° relative to the axis), the manufacturing effort in the machining process is comparatively low because only a small amount of material needs to be removed. An already conical blank can be further processed using the method according to the invention by increasing the cone angle.

Advantageous developments of the invention are the objects of the dependent claims.

It can be advantageous to have step A comprise at least one of the following sub-steps, where the sub-steps are in particular—but not necessarily—carried out in the sequence specified:

Sub-step A-1: producing the blank from metal, in particular in the form of a cylinder, preferably by turning the blank from a raw material or by bending a sheet metal strip round and welding it. With these techniques, a sleeve-like blank can be produced in an in particular simple manner.

Sub-step A-2: clamping the blank in a clamping device, in particular in the axial direction, preferably between two clamping tools or tool parts, preferably between a holding down clamp and an expanding chuck clamped radially against the inner circumference of the blank. This measure enables precise processing of the blank.

Sub-step A-3: arranging the sleeve-like blank such that an axis of the blank is aligned exactly or substantially vertically. With this arrangement or alignment of the blank, gravity-related influences can be minimized.

Sub-step A-4: turning the blank about its axis, in particular with the axis aligned vertically, preferably by way of the clamping device according to sub-step A-2. This measure allows for particularly homogeneous (rotationally symmetrical) processing of the blank to be achieved.

Sub-step A-5: Forming the blank to produce a collar that projects radially (towards the axis or inwardly, respectively), in particular at an axial end of the blank preferably at the upper or lower edge of the blank, particularly preferably by flanging the edge inwardly, very particularly preferably while the blank is being turned about its axis. This collar allows for the blank to be clamped axially and thereby for the wall section to be formed to be processed under considerable force. The flanging is in particular carried out at the lower edge of the blank because this lower edge is easily accessible for processing. The forming is in particular carried out using a forming tool that has an inner and an outer forming roller. In the context of this invention, the term collar refers to a radial projection with respect to the sleeve shape of the blank, at which the blank can be clamped in the axial direction. The collar can be formed to ring-shaped and extend exactly or substantially in a radial plane relative to the axis. The collar is in particular formed to be circumferential, but can also have discontinuations.

Sub-step A-6: releasing the blank from the clamping device according to sub-step A-2. In this way, the blank can be aligned particularly advantageously for the subsequent forming of the wall section to be formed.

Sub-step A-7: arranging the blank such that an axis of the blank is aligned exactly or substantially vertically, preferably such that the collar produced in sub-step A-5 is disposed at the upper end of the blank. The wall section to be formed of the blank is therefore particularly easily accessible for subsequent rolling processing.

Sub-step A-8: clamping the blank in a clamping device, in particular in the clamping device according to sub-step A-2 and/or in a different arrangement than in sub-step A-2, preferably in the axial direction, particularly preferably between two clamping tools or tool parts, very particularly preferably by clamping the collar created in sub-step A-5 between a holding down clamp and a counterpart, such as the expanding chuck according to sub-step A-2, where the expanding chuck is in particular additionally tensioned radially against the inner circumference of the blank. With this measure, the blank can be centered and processed well. The use of the same clamping device as for producing the collar avoids the use of a second clamping device and therefore simplifies the structure of a respective processing device.

It can be advantageous to have step B comprise at least one of the following sub-steps, where the sub-steps are in particular—but not necessarily—carried out in the sequence specified:

Sub-step B-1: placing a rolling tool at the wall section to be formed of the blank, in particular at the inner circumference and/or at the outer circumference of the wall section to be formed, preferably to the end of the wall section to be formed facing the collar. This measure enables rolling processing in the subsequent processing step.

Sub-step B-2: moving the rolling tool and/or the blank such that the rolling tool rolls on a path along the inner circumference and/or along the outer circumference of the wall section to be formed and thus forms the wall section to be formed while reducing its wall thickness as well as changing its inner circumference and/or its outer circumference, where in particular the path has at least in sections or entirely the shape of a helix, such as the shape of a cylindrical or conical screw or spiral, where the width of the path is preferably equal to or greater than the pitch of the helix turns so that the adjacent turns of the path adjoin or overlap one another, where the path particularly preferably begins at the end of the wall section to be formed facing the collar that was created in sub-step A-5 and/or runs in a direction facing away from the collar that was created in sub-step A-5 and/or ends at the end of the wall section to be formed that faces away from the collar that was created in sub-step A-5. With this measure, particularly material-friendly and uniform rolling processing of the wall section to be formed of the blank can be carried out. In particular, due to the helical rolling path of the rolling tool, each region of the wall section to be formed can be processed uniformly and with almost identical rolling pressure so that optimal shaping of the wall section to be formed can be achieved. If the pitch of the helical path is smaller than the width of the path or the track, respectively, that the rolling tool leaves behind on the wall section to be formed as it rolls along, then the adjacent turns of the path overlap. If the pitch of the path is equal to the path width, then the adjacent turns of the path adjoin each other.

Sub-step B-3: raising (the rollers or forming rollers) of the rolling tool from the wall section to be formed of the blank. This measure allows for the rolling processing to be repeated according to sub-step B-2.

Sub-step B-4: Repeating sub-step B-2, in particular sub-steps B-1, B-2 and B-3, until the desired shape of the wall section to be formed has been obtained, where preferably the angle of the wall section to be formed relative to the axis of the blank according to sub-step B-2 is changed with each repetition, is in particular increased, preferably by an angle in the range from 0.1 to 5°, particularly preferably by an angle in the range from 0.5 to 2°, very particularly preferably by an angle of 1°. In order to increase the angle of the wall section to be formed relative to the axis of the blank, for example, from 0° to 10°, in particular ten repetitions of sub-step B-2 are required.

Step B is in particular carried out with a form rolling tool (Flexformer). Step C is in particular carried out with another tool.

It can be advantageous to have step C comprise at least one of the following sub-steps, where the sub-steps are in particular—but not necessarily—carried out in the sequence specified:

Sub-step C-1: introducing at least one wall break into the rolled wall section, in particular one wall break in each corner region of a rolling element pocket to be formed, preferably with a cutting tool (such as a drilling or milling tool). The wall section that has been hardened by rolling can thereby be penetrated particularly easily and precisely. In addition, shaping the rolling element pockets is facilitated by introducing wall openings using the cutting process than using the forming process.

Sub-step C-2: severing the rolled wall section to form one of the rolling element pockets along a closed line, in particular at least in sections along a straight line preferably connecting several wall breaks, particularly preferably using a drilling or milling tool. In particular, a plate-shaped wall piece with an outer contour corresponding to the inner contour of the rolling element pocket is cut out from the rolled wall section along the previously manufactured wall breaks in order to form a single rolling element pocket.

Sub-step C-3: forming the contour of the rolling element pocket, in particular such that the contour of the rolling element pocket has an exact or substantially rectangular shape, where preferably the longer side of the rectangle is parallel to the axis of rotation (of the blank) and/or the shorter side of the rectangle is arranged in a plane aligned perpendicular to the axis of rotation (of the blank). This sub-step C-3 is ideally carried out in one go together with sub-step C-2. If only coarse processing is carried out in sub-step C-2, then the contour of the rolling element pocket can be specifically reworked to size in sub-step C-3.

Sub-step C-4: forming a plurality of circumferentially spaced rolling element pockets in the rolled wall section, in particular by repeating sub-steps C-1 to C-3, preferably such that the number of rolling element pockets is in particular in the range from 10 to 200, or in the range from 20 to 100, or in the range from 50 to 80, where particularly preferably at least two or all of these rolling element pockets are formed to be non-uniform and/or at least three or all of these rolling element pockets are spaced from one another at irregular angular distances in the circumferential direction. Due to the individual configuration of the rolling element pockets, so that the rolling element pockets have slightly different contours and/or orientations and/or angular distances from one another, the running properties of the rolling elements to be received therein can be specifically influenced in the use case of the angular bearing cage. This can, for example, reduce the wear on the bearing surfaces of the angular bearing or increase its service life, respectively.

A further aspect of the present invention relates to a component with a formed wall section, produced from a sleeve-like blank by rolling a wall section to be formed of the blank while changing the angle of the wall section to be formed relative to the axis of the blank, in particular according to the method of one of the preceding configurations. By introducing rolling element pockets into the rolled wall section, a rolling bearing cage according to the invention, in particular an angular bearing cage, can be produced from this component or semi-finished product, respectively. The component or semi-finished product, respectively, can also be used or further processed in other ways.

The object of the invention is also satisfied by a device for producing a rolling bearing cage, in particular an angular bearing cage, from a sleeve-like blank, in particular, comprising:

a clamping tool for clamping the sleeve-like blank.
a rolling tool that is configured to form at least one wall section of the sleeve-like blank to be formed by rolling.
a tool for introducing rolling element pockets into the rolled wall section.

It can be advantageous to have the device comprise a control device that is configured (or programmed) to control the rolling tool and possibly the clamping tool such that the rolling tool rolls along the inner circumference and/or along the outer circumference of the wall section be formed of the blank that is clamped in the clamping tool and thus forms the wall section to be formed while reducing its wall thickness and while changing its inner circumference and/or its outer circumference (stepwise) by rolling. By reducing the wall thickness and changing the inner circumference and/or its outer circumference of the wall section to be formed, hardening of the material can be achieved simultaneously with the forming.

It can be advantageous to have the control device be configured (or programmed) so as to roll the rolling tool on a path at least in sections or entirely in the form of a helix, such as a cylindrical or conical screw or spiral, along the inner circumference and/or along the outer circumference of the wall section to be formed, in particular such that adjacent turns of the path adjoin or overlap one another (i.e. pitch <path width). With this configuration, particularly material-friendly and uniform processing of the wall section to be formed can be achieved.

However, it can also be advantageous to have the control device be configured (or programmed) so as to control the rolling tool such that the rolling tool rolls consecutively in several paths along the inner circumference and/or along the outer circumference of the wall section to be formed of the blank that is clamped in the clamping tool and then forms the wall section to be formed by rolling while reducing its wall thickness as well as changing its inner circumference and/or its outer circumference until the desired shape of the wall section to be formed has been obtained, where the angle of the wall section to be formed relative to the axis of the blank is changed with each path, is in particular increased, preferably by an angle in the range from 0.1 to 5°, particularly preferably by an angle in the range from 0.5 to 2°, very particularly preferably by an angle of 1°.

It can be useful to have the rolling tool have a counter-rotating pair of rollers (or pair of forming rollers) with an adjustable roller gap for receiving the wall section to be formed in the roller gap, where the axes of rotation of the rollers can be aligned in particular parallel to one another at least in a plane that contains the axis of the blank clamped in the clamping tool, where the angle and/or the spacing of the axes of rotation of the pair of rollers relative to the axis of the blank that is clamped in the clamping tool is preferably adjustable. With this configuration, different contours of the wall section to be formed can be realized.

Further advantageous developments of the invention shall arise from combinations of the features disclosed in the specification, the claims, and the drawings.

The blank in particular has at least one of the following properties:

The blank is made of metal.

The blank is made of welded sheet metal that is bent round.

The blank is produced from a raw material by metal-cutting manufacturing, in particular by turning.

The blank has a length (measured along the axis) in the range from 50 to 500 mm, in particular in the range from 100 to 400 mm, preferably in the range from 200 to 300 mm.

The blank has an (inner and/or outer) diameter in the range from 500 to 5000 mm, in particular in the range from 1000 to 4000 mm, preferably in the range from 1200 to 2000 mm.

The blank has a wall thickness in the range from 1 to 30 mm, in particular in the range from 5 to 25 mm, preferably in the range from 10 to 20 mm.

The blank has a uniform wall thickness over its length.

The blank has a uniform (inner and/or outer) diameter over its length.

The blank has a cylindrical or conical shape.

The blank comprises at least one flanged edge or collar, respectively.

The blank comprises a radially projecting collar. The collar in particular projects radially towards the axis or inwardly, respectively. The inner diameter of the ring-shaped collar is in particular in the range from 50-99%, preferably in the range from 60-85%, particularly preferably in the range from 70-90% of the outer diameter of the wall section to be formed of the blank.

The collar extends at least in sections, in particular entirely, exactly or substantially in a plane aligned radially relative to the axis.

The blank has a continuous surface (without breaks) on the inner circumference and/or on the outer circumference, in particular in the entire wall section to be formed.

The component or angular bearing cage, respectively, in particular has at least one of the following properties:

The component or the angular bearing cage, respectively, comprises the formed wall section.

The component or the angular bearing cage, respectively, comprises a collar which projects radially inwardly and/or outwardly.

The formed wall section comprises a larger end (or an end with a larger diameter) and a smaller end (or an end with a smaller diameter).

The (inner and/or outer) diameter of the formed wall section increases monotonically, in particular strictly monotonically, preferably linearly from the smallest to the largest diameter.

The component or the angular bearing cage, respectively, has a length (measured along the axis) in the range from 50 to 450 mm, in particular in the range from 100 to 350 mm, preferably in the range from 200 to 250 mm.

The formed wall section at its smaller end has an (inner and/or outer) diameter in the range from 500 to 5000 mm, in particular in the range from 1000 to 4000 mm, preferably in the range from 1200 to 2000 mm.

The formed wall section at its larger end has an (inner and/or outer) diameter in the range from 550 to 5500 mm, in particular in the range from 1100 to 4400 mm, preferably in the range from 1300 to 2200 mm.

The ratio between the (inner and/or outer) diameter at the larger end and the (inner and/or outer) diameter at the smaller end of the formed wall section is in the range from 1.01 to 1.50, in particular in the range from 1.02 to 1.10, preferably in the range from 1.03 to 1.07.

The formed wall section has a wall thickness in the range from 1 to 30 mm, in particular in the range from 5 to 25 mm, preferably in the range from 8 to 15 mm.

The ratio of the wall thickness of the formed wall section to the wall thickness of the wall section to be formed is in the range from 0.5 to 0.99, in particular in the range from 0.8 to 0.99, preferably in the range from 0.85 to 0.95.

The opening angle of the formed wall section to the axis of the component or angular bearing cage, respectively, is in the range from 5 to 45°, in particular in the range from 7 to 35°, preferably in the range from 8 to 25°.

The opening angle of the formed wall section to the axis of the component or angular bearing cage, respectively, is larger by 5 to 30°, in particular by 7 to 25°, preferably by 8 to 20° than the opening angle of the sleeve-like blank.

A radius between the formed wall section and the collar on the inner side of the bending is in the range from 1 to 100%, in particular in the range from 5 to 50%, preferably in the range from 20 to 40% of the wall thickness of the component or angular bearing cage, respectively.

A radius between the formed wall section and the collar on the outer side of the bending is in the range from 50 to 300%, in particular in the range from 80 to 200%, preferably in the range from 100 to 150% of the wall thickness of the component or angular bearing cage, respectively.

The component or the angular bearing cage, respectively, comprises a cylindrical wall section which in particular adjoins the larger end of the formed wall section, where the cylindrical wall section in particular has a length (measured along the axis) in the range from 5 to 25%, in particular in the range from 8 to 20%, preferably in the range from 10 to 15% of the total length of the component or angular bearing cage, respectively.

The formed wall section has a length (measured along the axis) in the range from 25 to 99%, in particular in the range from 50 to 95%, preferably in the range from 75 to 90% of the total length of the component or angular bearing cage, respectively.

The component or the angular bearing cage, respectively, in the region of the formed wall section comprises a plurality of rolling element pockets, in particular of an exactly or substantially rectangular shape, where the longer side of the rectangular shape is preferably exactly or substantially parallel to the axis of the component and/or the shorter side of the rectangular shape is aligned exactly or substantially in a plane perpendicular to the axis of the component. The rolling element pockets can be configured to be identical to or to differ from one another. The rolling element pockets are configured, for example, to receive rollers or balls as rolling elements. The rolling element pockets are in particular arranged distributed in the circumferential direction at uniform or different angular distances about the axis of rotation of the angular bearing cage.

TERMS AND DEFINITIONS

Rolling is a manufacturing process from the group of pressure forming in which the (in particular metallic) material is formed between two or more rotating tools and its cross section is then reduced. If the forming takes place above the recrystallization temperature of the material, it is referred to as hot rolling, otherwise as cold rolling. Rolling according to this invention can be hot rolling or cold rolling.

Cone: In geometry, a cone is a surface of revolution, formed by a curve rotating about an axis (straight line). The curve can be a straight line intersecting the axis so that the cone is designed as a taper. In the context of this invention, the cone shape is not confined to the shape of a taper or truncated cone in which the diameter increases linearly from the smallest to the largest diameter. The cone shape can in particular also have a shape in which the diameter changes, for example, monotonically or strictly monotonically from the smallest to the largest diameter, for example, a nozzle shape.

The term rolling element seat comprises any opening, recess, bore, window or pocket for rolling elements.

DETAILED DESCRIPTION

Figure 1A:
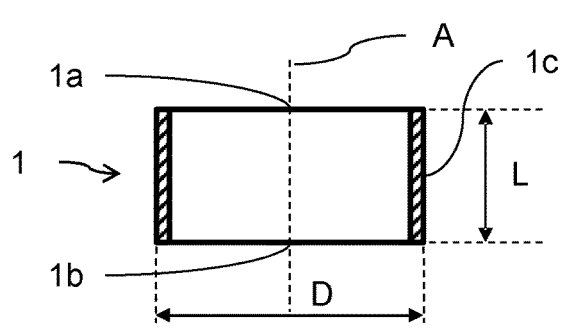
FIGS. 1A and 1B show schematic cross-sectional views of a sleeve-shaped or cylindrical blank (FIG. 1A) and a sleeve-like or cone-shaped blank (FIG. 1B), each in an initial state in a sectional plane containing the central axis of the blank.
Figure 1B:
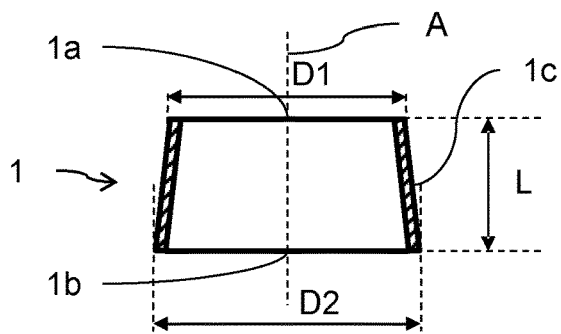

The preferred embodiment of the invention shall be described in detail hereafter with reference to the accompanying drawings. The illustrations of the blank, the component or semi-finished product, respectively, for producing the later angular bearing cage and the tools in the accompanying drawings are schematic and not to scale.

The method disclosed and the device disclosed are used for producing a component 1" with a formed wall section 1c from a sleeve-like blank 1, 1', where a wall section 1c to be formed of blank 1, 1' is rolled to a cone shape while changing the angle α of wall section 1c to be deformed (stepwise) relative to axis A of blank 1, 1'. Pockets for receiving rolling elements—so-called rolling element pockets—can then be introduced into wall section 1c that is rolled to a cone shape for producing an angular bearing cage from component or semi-finished product 1", respectively, with a cone-shaped wall section 1c. In principle, it is also possible to further process component or semi-finished product 1", respectively, with a cone-shaped wall section 1c in a different way. Although this embodiment describes a component or semi-finished product 1", respectively, with a cone-shaped wall section 1c, it is expressly mentioned at this point that other, in particular rotationally symmetrical, geometries/contours can also be produced by so-called contour rolling.

Reference character 1 designates the blank in its unprocessed initial state. Reference character 1' designates the blank after the formation of collar 1d created for axial clamping. Reference character 1" designates the component or semi-finished product, respectively, made from sleeve-like blank 1. The angular bearing cage according to the invention is created from this component or semi-finished product, respectively, by introducing the rolling element pockets into rolled wall section 1c.

Sleeve-like blank 1 has, for example, an axial length of approximately 15 cm and a diameter of 100 cm at a wall thickness of 15 mm.

Blank 1 is made of metal and is produced in a cylindrical shape by turning a raw material by bending a rectangular sheet metal strip round and welding it (sub-step A-1).

To form collar 1d which projects radially inwardly to axis A of blank 1, blank 1 is clamped in the axial direction in a clamping device S1, S2 consisting of a holding down clamp S1 and an expanding chuck S2 which is to be tensioned radially against the inner circumference of blank 1 (sub-step A-2) so that an axis A of blank 1 is aligned exactly or substantially vertically (sub-step A-3).

When turning about its vertically aligned axis A by way of clamping device S1, S2 (sub-step A-4), blank 1 is flanged inwardly to produce collar 1d, which projects radially to axis A of blank 1, at lower edge 1b by way of a forming tool W1 consisting of two counter-rotating forming rollers (sub-step A-5). When flanging lower edge 1b, the inner forming roller is positioned "in the corner" of blank 1' rotating about its axis A, where the outer shaping roller is pivoted by 90° with respect to the inner forming roller in order to shape collar 1d such that it projects radially inwardly to axis A of blank 1. Blank 1' is thereafter released from clamping device S1, S2 (sub-step A-6).

After turning flanged blank 1, 1' around so that collar 1d is at the top when axis A is aligned vertically (sub-step A-7), blank 1, 1' is clamped again in a different arrangement in clamping device S1, S2 by clamping collar 1d between holding down clamp S1 and expanding chuck S2.

For rolling processing the wall section to be formed according to step B, a rolling tool W2 consisting of two counter-rotating rollers or forming rollers, respectively, is placed on the inner circumference and on the outer circumference of wall section 1c to be formed at the latter's end facing collar 1d (sub-step B-1).

Figure 3:
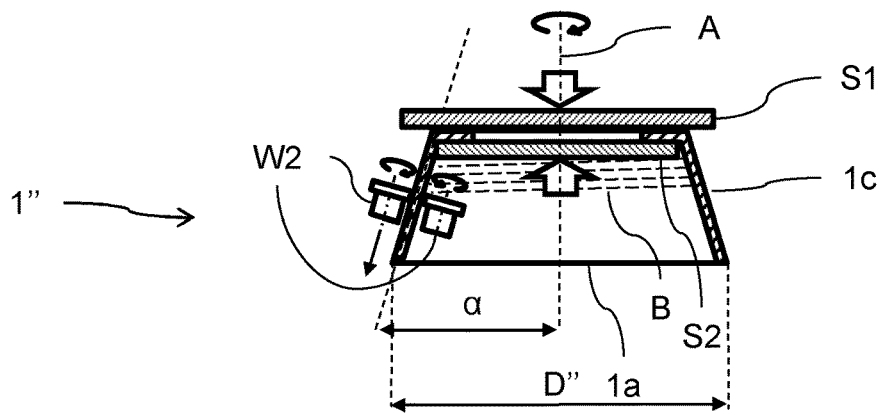
FIG. 3 shows a schematic cross-sectional view of a component or semi-finished product, suitable for producing the angular bearing cage according to the invention with a formed wall section, which is made from the blank according to FIG. 2, in a sectional plane containing the central axis in a state in which the contour rollers of the wall section to be formed for enlarging the opening angle starting from the side of the collar is advanced and almost completed.
Figure 4:
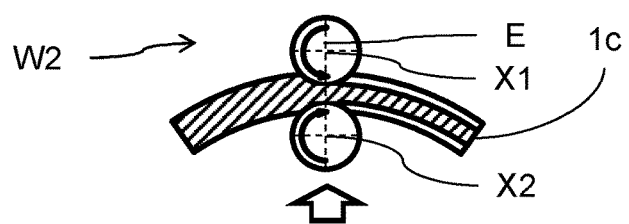
FIG. 4 shows a schematic cross-sectional view of a part of the wall section to be formed of the component or semi-finished product with a formed wall section suitable for producing the angular bearing cage according to the invention during rolling processing in a sectional plane aligned perpendicular to the axis, where the rolling tool has a counter-rotating pair of rollers or forming rollers, respectively, with a roller gap disposed therebetween in which the wall section to be formed is transformed to a cone shape while changing its inner and outer diameter as well as changing its wall thickness.

Starting out from this position, rolling tool W2 is moved—while blank 1, 1' is turned about its axis A by way of clamping device S1, S2—on a helical path B to the lower end of blank 1, 1' so that the rollers roll along the inner circumference and along the outer circumference of wall section 1c to be formed and there form wall section 1c to be formed while reducing its wall thickness and changing its inner and outer circumference (cf. FIG. 4). Rolling tool W2 is there not turned about axis A, but only blank 1, 1', where the angle and distance of axes of rotation X1,2 of the rollers relative to axis A of blank 1, 1' can be changed at least in a plane E containing axis A of blank 1, 1'. Path B runs as a helix in the form of a conical screw or spiral with mutually overlapping turns, starting out from the end of wall section 1c to be formed facing collar 1d in a direction facing away from collar 1d to the other axial end of blank 1, 1' (sub-step B-2). The axial length of the rolling tool or path width, respectively, and the pitch or lead of path B per turn about axis A are there matched with one another such that path B in adjacent turns adjoins or overlaps one another so that the inner circumference as well as the outer circumference of wall section 1c to be formed can be processed seamlessly. In the present embodiment, wall section 1c to be formed has the shape of a truncated cone in the illustration according to FIG. 3, the diameter of which increases strictly monotonously and linearly starting out from collar 1d towards the end of blank 1, 1' that faces away from the former. However, it is also possible to produce the formed wall section, for example, in the form of a nozzle with a curvature formed to be outwardly convex and/or concave.

After raising both rollers or forming rollers, respectively, of rolling tool W2 from wall section 1c of blank 1, 1' to be formed (sub-step B-3), sub-steps B-1, B-2 and B-3 are repeated until the desired shape of wall section 1c to be formed has been obtained (sub-step A-4). Angle α of wall section 1c to be formed is increased with each repetition of sub-step B-2 by an angle of approximately 1° with respect to axis A of blank 1, 1'. In order to create a cone shape having an angle of 10° relative to axis A or an opening angle of 20°, respectively, starting out from a cylindrical blank 1,1', approximately 10 repetitions of sub-step B-2 are required. Depending on the width of rolling tool W2 and the axial length of wall section 1c to be formed, path B comprises approx. 10 turns or 10 revolutions about axis A of blank 1, 1'. The turning speed of blank 1, 1' about its axis is in particular in the range from 30 to 120 revolutions per minute or in the range from 0.5 to 2 revolutions per second, respectively.

The device disclosed is primarily used to produce a component 1" or semi-finished product, respectively, with a formed wall section 1c from a sleeve-like blank 1, 1' by rolling wall section 1c to be formed, in particular also to introduce rolling element pockets into rolled wall section 1c in order to complete the angular bearing cage according to the invention from this component 1" or semi-finished product, respectively. In addition to clamping tool S1, S2 described above and rolling tool W2 described above, this device in particular also comprises a control device which is configured so as to move rolling tool W2 and possibly clamping tool S1, S2 in the manner described above so that wall section 1c of sleeve-like blank 1, 1' to be formed is formed, i.e. transformed into the desired shape. This device in particular also comprises a corresponding device or a tool, such as a milling tool, for introducing the rolling element pockets into the wall section of component 1" or semi-finished product, respectively, formed by rolling.

The core idea of the invention can be summarized as follows:

Raw Material

The starting material is a sleeve made of welded sheet metal that is bent round. Alternatively, the sleeve can be made from a tube or rolled ring which has an allowance of, for example, 5 mm on all sides compared to the finished dimensions of the sleeve. This reduces the amount of material used because the final contour is subsequently created by way of a forming process.

Process Description

The method according to the invention comprises a forming method of a component 1" or semi-finished product, respectively, with a formed wall section without material removal. The material used is largely retained after the wall section to be formed has been formed.

For producing specific angled rings, the sheet metal ring is held over the inner diameter by way of a segment chuck and affixed with a holding down clamp.

In the first work step, the lower edge of the basic material is formed inwardly to create the required contour.

The inwardly formed edge or collar, respectively, serves as a receiving edge for the second work step in which the outer cone is formed. To do this, the inner edge or collar, respectively, is clamped between the segment chuck and the holding down clamp.

The sleeve is clamped with hydraulic pressure by way of two oppositely disposed rollers. When the clamped sleeve performs a turning motion, the sleeve wall is formed outwardly by way of the rollers in several steps until the required contour has been obtained.

Further Embodiments

Figure 2:
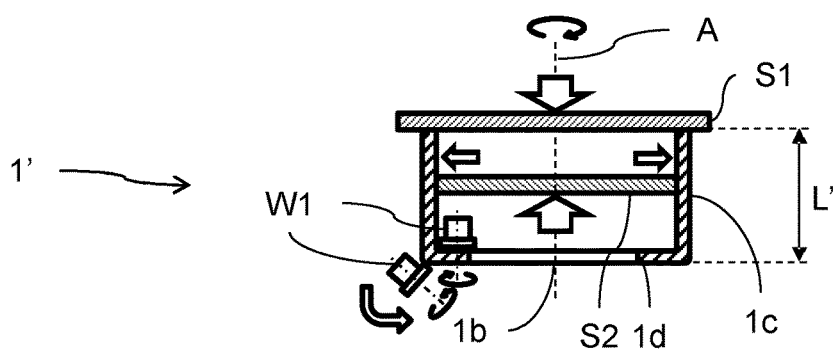
FIG. 2 shows a schematic cross-sectional view of the blank according to FIG. 1A in a sectional plane containing the central axis of the blank in a state after the lower edge has been flanged to produce the ring-shaped collar at which the blank is subsequently axially clamped.
Figure 5:
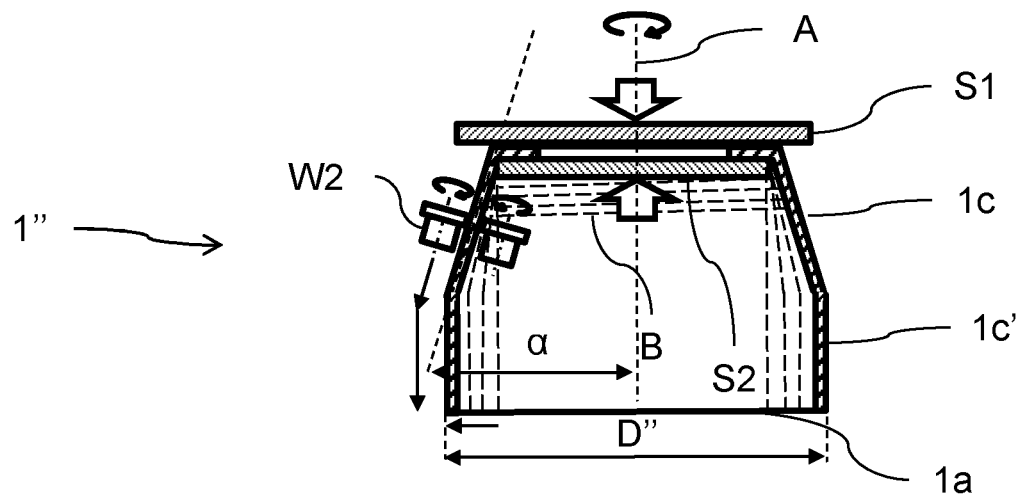
FIG. 5 shows a schematic cross-sectional view of a component or semi-finished product with a formed wall section suitable for producing the angular bearing cage according to the invention and which is made from the blank according to FIG. 2, in a sectional plane containing the central axis in a state in which the contour rollers of the wall section to be formed for enlarging the opening angle starting from the side of the collar is advanced and almost completed, and the wall section to be formed is rolled stepwise to a conical or truncated cone-shaped section and an adjoining or final cylindrical section.

According to a further embodiment, wall section 1c to be formed in the illustration according to FIG. 5 has the shape of a truncated cone with an adjoining cylindrical section 1c'. For this purpose, starting from the production step shown in FIG. 2, wall section 1c to be formed can be rolled to a cone-shaped section with an adjoining or final cylindrical section 1c' instead of to a pure cone or truncated cone shape (FIG. 3).

Figure 6:
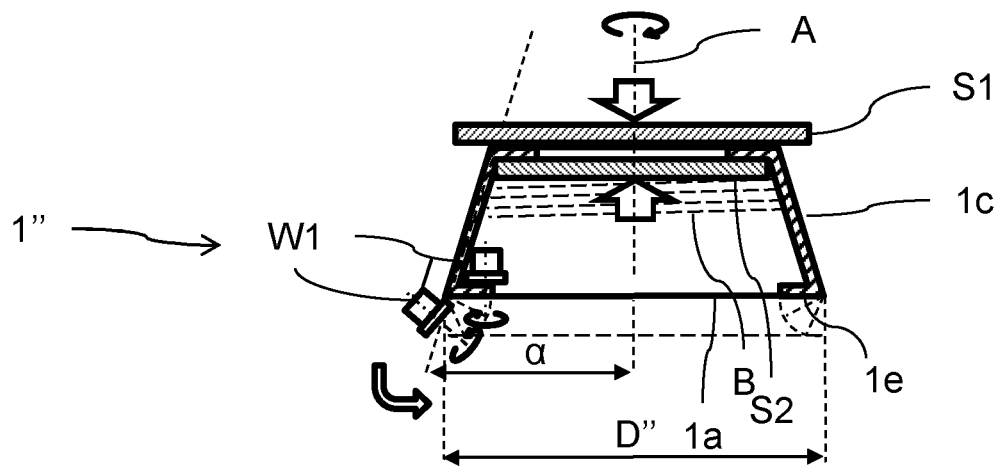
FIG. 6 shows a schematic cross-sectional view of a component or semi-finished product with a formed wall section suitable for producing the angular bearing cage according to the invention and which is made from the blank according to FIG. 2, in a sectional plane containing the central axis in a state in which the contour rollers of the wall section to be formed for enlarging the opening angle starting from the side of the collar is advanced or almost completed, and the upper edge of the wall section to be formed as well is rolled or flanged inwardly stepwise to produce a ring-shaped collar.

According to a further embodiment, wall section 1c to be formed in the illustration according to FIG. 6 has the shape of a truncated cone with a ring-shaped collar 1d, 1e on both sides. For this purpose, starting from the production steps shown in FIG. 2, 3 or 5, upper edge 1a of wall section 1c, 1c' to be formed, which is located at the bottom after flanged blank 1, 1' has been turned around, can be rolled to a ring-shaped collar 1e so that it projects radially inwardly to axis A of blank 1, 1', 1". This can increase the stability of the rolling bearing cage.

The invention claimed is:

1. A method for producing a rolling bearing cage from a sleeve-shaped blank, comprising the steps of:
   step A: providing the sleeve-shaped blank extending along an axis;
   step B: rolling a wall portion to be formed of said blank while changing an angle of said wall portion to be formed relative to said axis of said blank to create a rolled wall portion; and step C: introducing rolling element seats into said rolled wall portion,
wherein the step B comprises the following sub-steps:
sub-step B-2: moving a rolling tool and/or said blank such that said rolling tool rolls on a path along the inner circumference and/or along the outer circumference of said wall portion to be formed and forms said wall portion to be formed while reducing a thickness of said wall portion as well as changing an inner circumference and/or an outer circumference of said wall portion; and
sub-step B-4: repeating sub-step B-2 until a desired shape of said wall portion to be formed has been obtained, wherein said angle is changed with each repetition.

2. The method according to claim 1, wherein step A comprises at least one of the following sub-steps, and wherein the sub-steps are carried out in the sequence specified:
sub-step A-1: producing said blank from metal in the form of a cylinder by turning said blank from a raw material or by bending a sheet metal strip around and welding the sheet metal strip together;
sub-step A-2: clamping said blank in a clamping device in an axial direction between two clamping tools or tool parts, which are a holding down clamp and an expanding chuck clamped radially against the inner circumference of said blank;
sub-step A-3: arranging said sleeve-shaped blank such that the axis of said blank is aligned exactly or substantially vertically;
sub-step A-4: turning said blank about the axis, with said axis aligned vertically, by way of said clamping device according to sub-step A-2;
sub-step A-5: forming said blank to produce a collar that projects radially, at an axial end of said blank, at the upper or lower edge of said blank, by flanging said edge inwardly while said blank is being turned about its axis;
sub-step A-6: releasing said blank from said clamping device according to sub-step A-2;
sub-step A-7: arranging said blank such that the axis of said blank is aligned exactly or substantially vertically, such that said collar produced in sub-step A-5 is disposed at the upper end of said blank; and
sub-step A-8: clamping said blank in said clamping device according to sub-step A-2 and/or in a different arrangement than in sub-step A-2 in the axial direction, by clamping said collar created in sub-step A-5 between said holding down clamp and said expanding chuck according to sub-step A-2, wherein said expanding chuck is additionally tensioned radially against the inner circumference of said blank.

3. The method according to claim 2, wherein said path has at least sections of or entirely a helix shape where the width of said path is equal to or greater than a pitch of helix turns of the helix shape so that adjacent turns of said path adjoin or overlap one another, and wherein said path begins at the end of said wall portion to be formed facing said collar that was created in the sub-step A-5 and/or runs in a direction facing away from said collar that was created in the sub-step A-5 and/or ends at the end of said wall portion to be formed that faces away from said collar that was created in the sub-step A-5.

4. The method according to claim 1, wherein step B additionally comprises the following sub-steps B-1 and B-3, and wherein the sub-steps B-1 to B-4 are carried out in the sequence specified:
sub-step B-1: placing the rolling tool at the inner circumference and/or at the outer circumference of said wall portion to be formed, to the end of said wall portion to be formed facing said collar; and
sub-step B-3: raising said rolling tool from said wall portion to be formed of said blank.

5. The method according to claim 1, wherein said angle of said wall portion to be formed is increased relative to said axis of said blank with each repetition by an angle of 1°.

6. The method according to claim 1, wherein step C comprises at least one of the following sub-steps, where the sub-steps are carried out in the sequence specified:
sub-step C-1: introducing one wall break in each corner region of a rolling element pocket to be formed, with a cutting tool;
sub-step C-2: severing said rolled wall portion to form one said rolling element pocket along a closed line connecting several wall breaks, at least in sections along a straight line, using a drilling or milling tool;
sub-step C-3: forming a contour of said rolling element pocket such that the contour of said rolling element pocket has an exact or substantially rectangular shape, wherein a longer side of the rectangle is parallel to the axis of rotation and/or a shorter side of the rectangle is arranged in a plane aligned perpendicular to said axis of rotation; and
sub-step C-4: forming a plurality of circumferentially spaced rolling element pockets in said rolled wall portion, by repeating sub-steps C-1 to C-3, such that a number of rolling element pockets is in a range from 50 to 80, and wherein at least two or all of the rolling element pockets are formed to be non-uniform and/or at least three or all of the rolling element pockets are spaced from one another at irregular angular distances in a circumferential direction.

7. A device for producing a component with a formed wall portion from a sleeve-shaped blank, comprising:
a clamping tool for clamping said sleeve-shaped blank along an axis
a rolling tool configured to form at least one wall portion to be formed of said sleeve-shaped blank by rolling, the at least one wall portion to be formed of said blank while changing an angle of said at least one wall portion to be formed relative to said axis of said blank to create said at least one wall portion; and
a tool for introducing rolling element pockets/seats into said rolled wall portion, and
a control device configured to control said rolling tool and said clamping tool so as to:
move said rolling tool and/or said blank such that said rolling tool rolls on a path along the inner circumference and/or along the outer circumference of said at least one wall portion to be formed and forms said at least one wall portion to be formed while reducing a thickness of said at least one wall portion as well as changing an inner circumference and/or an outer circumference of said at least one wall portion; and
repeating said move until a desired shape of said at least one wall portion to be formed has been obtained, wherein said angle is changed with each repetition.

8. The device according to claim 7, wherein said rolling tool comprises a counter-rotating pair of rollers with an adjustable roller gap for receiving said wall portion to be formed in said roller gap, wherein axes of rotation of said rollers are aligned parallel to one another at least in a plane that contains said axis of said blank that is clamped in said clamping tool, and wherein an angle and/or a spacing of said axes of rotation of said rollers relative to said axis of said blank that is clamped in said clamping tool is/are adjustable.

* * * * *